J. C. HAGEY.
TRACKER DEVICE FOR SHEET CONTROLLED INSTRUMENTS.
APPLICATION FILED DEC. 23, 1907.
1,031,923.
Patented July 9, 1912.
3 SHEETS—SHEET 2.
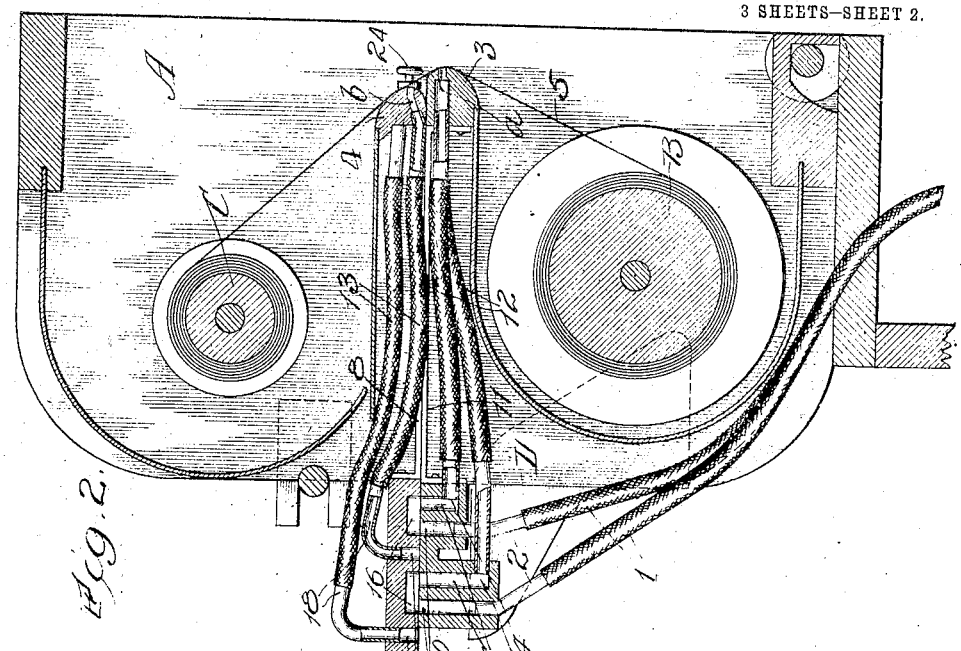
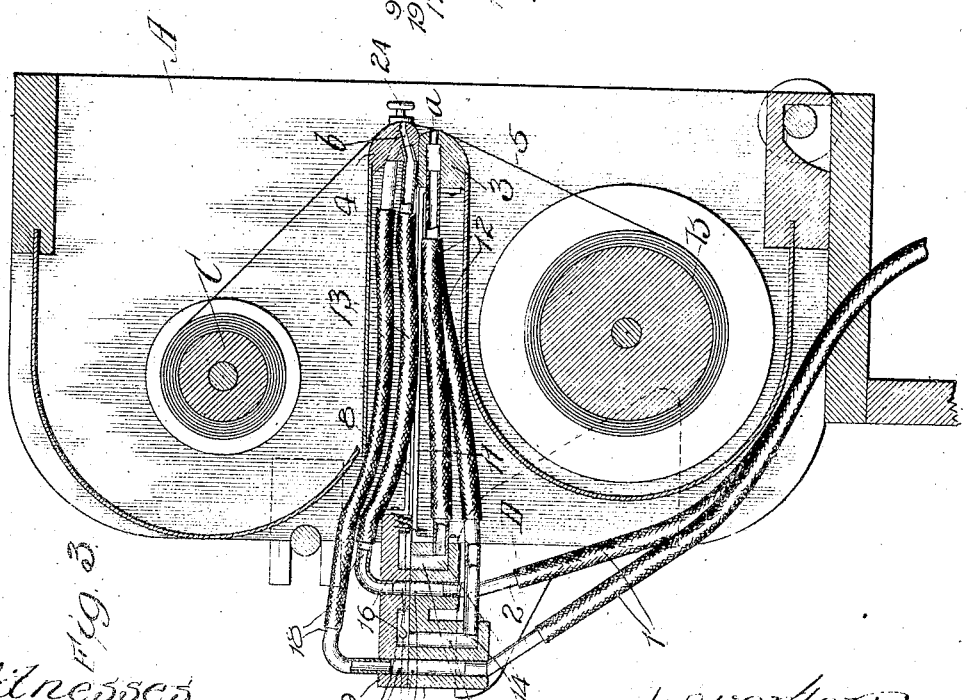
Witnesses
Harry R. White
Ray White
Inventor
J. Clarke Hagey
by
Paul B. Klugh
atty.

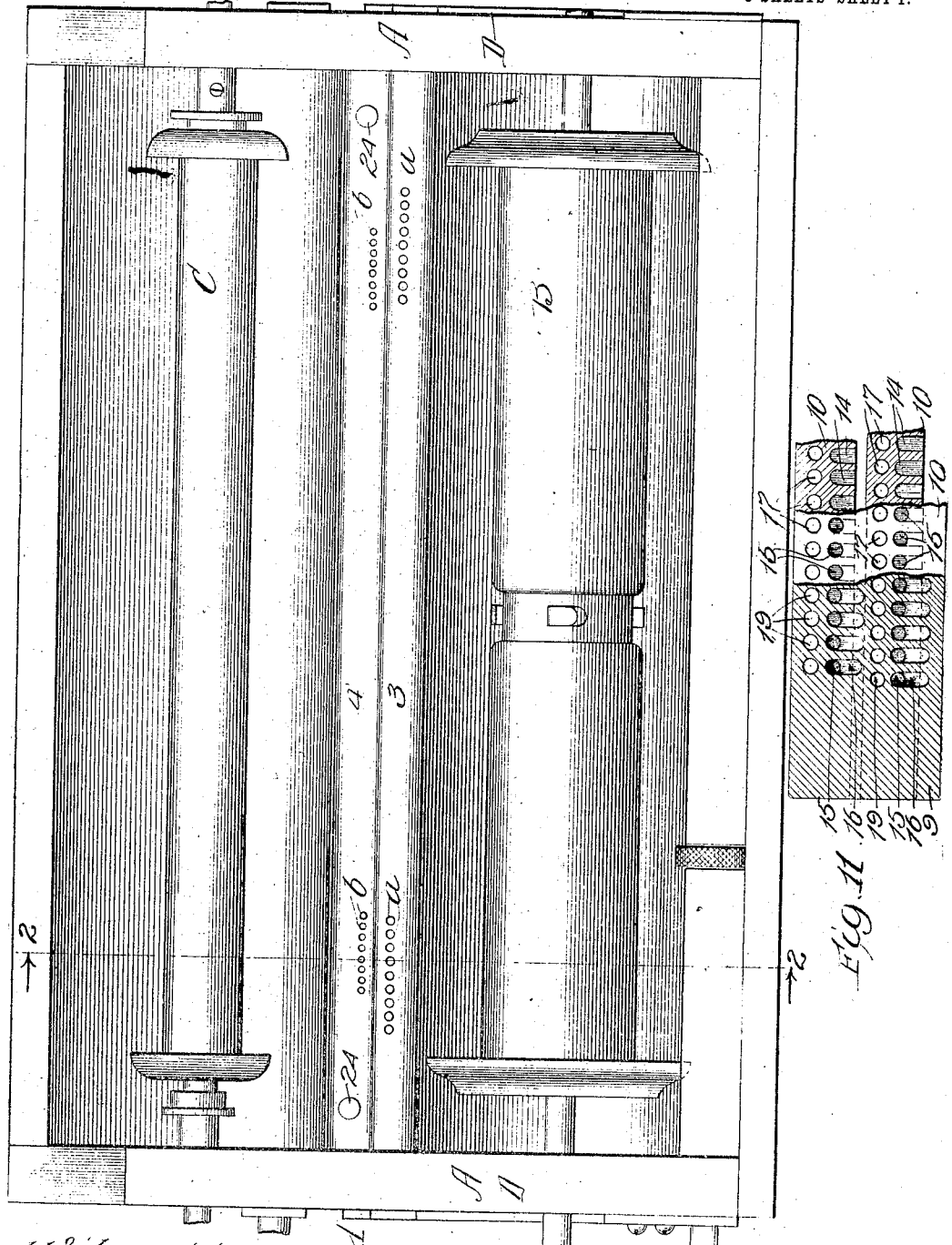

J. C. HAGEY.
TRACKER DEVICE FOR SHEET CONTROLLED INSTRUMENTS.
APPLICATION FILED DEC. 23, 1907.
1,031,923.
Patented July 9, 1912.
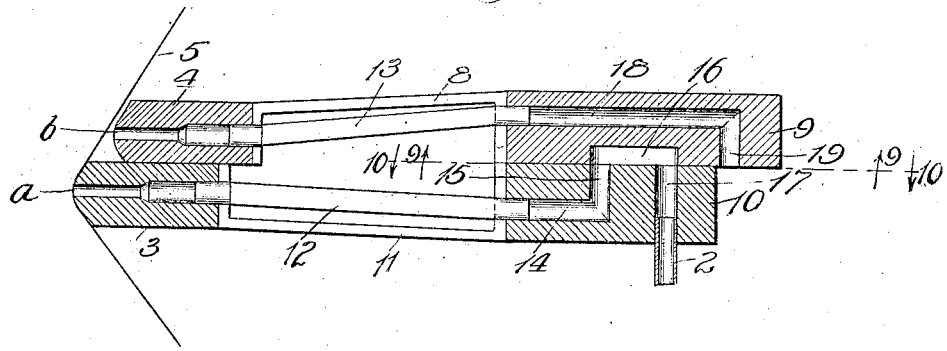
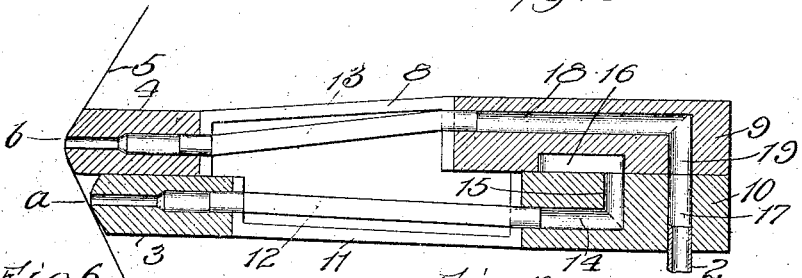
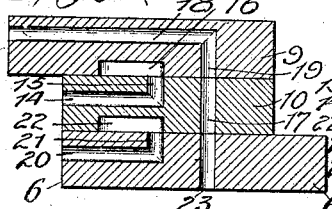 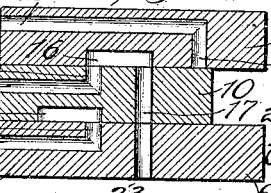 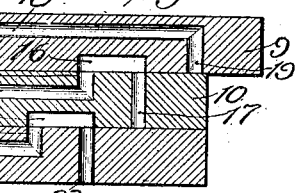
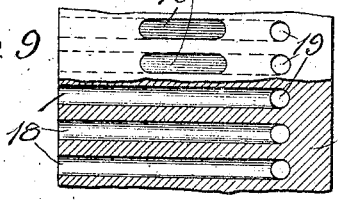 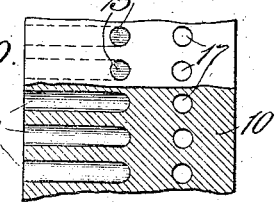

UNITED STATES PATENT OFFICE.

JAMES CLARKE HAGEY, OF CHICAGO, ILLINOIS, ASSIGNOR TO THE CABLE COMPANY, OF CHICAGO, ILLINOIS, A CORPORATION OF ILLINOIS.

TRACKER DEVICE FOR SHEET-CONTROLLED INSTRUMENTS.

1,031,923.      Specification of Letters Patent.      Patented July 9, 1912.

Application filed December 23, 1907. Serial No. 407,723.

*To all whom it may concern:*

Be it known that I, JAMES CLARKE HAGEY, a citizen of the United States, residing at Chicago, in the county of Cook and State of Illinois, have invented new and useful Improvements in Tracker Devices for Sheet-Controlled Instruments, of which the following is a specification.

My invention relates to instruments that are controlled as to their operation by traveling sheets and has for its chief object to provide a device to permit such control by a plurality of sheets having the selective means arranged thereupon or therein in different manner or scales.

A further object of this invention is to provide simple means for operatively connecting or disconnecting either one of a plurality of trackers having their conducting means arranged in different manner or scales.

Figure 1 is a view in front elevation showing my invention applied to an automatic musical instrument in which two differently scaled controlling-sheets may be employed; Fig. 2 is a view in cross-section upon the line 2—2 of Fig. 1, illustrating the operative connection of the lower tracker formed upon the movement of the upper tracker from operative position; Fig. 3 is a view similar to Fig. 2 showing the same parts in shifted relative position, wherein the lower tracker is disconnected by the movement of the upper tracker into operative position; Fig. 4 is a view in cross-section of a modification embodying the principles of the invention; Fig. 5 is a view similar to Fig. 4 showing the same parts in shifted relative position; Figs. 6, 7, and 8 are cross-sectional views of another modification demonstrating an application of the invention to provide for the operative connection and disconnection of three trackers; and Figs. 9, 10 and 11 are plan views taken, respectively, upon lines 9—9 and 10—10 of Fig. 4 and line 11—11 of Fig. 3, portions being broken away in each instance to show the arrangement of the underlying ducts or passages.

While I have shown and will describe my device as applied to a musical instrument, it will be understood that the invention may be used upon other instruments or machines controlled by perforated sheets or webs and also upon electrically controlled instruments using webs either provided with perforations or other selective means wherein contact is made by the web with a transversely arranged bar having means for conducting selected impulses imparted thereto by the said selective means.

Automatically-operated musical instruments have been usually controlled in operation by means of traveling perforated sheets wherein the perforations are arranged for registration with the apertures of a tracker placed in the instrument for contact with the sheet. The trackers of the different instruments are usually supplied with a single somewhat standardized scale of sixty-five apertures arranged six to each inch. For various reasons there is now desired an increase in the number of tracker-apertures and mechanisms controlled therethrough and it is the purpose of my invention to permit the operation of a single instrument either by sheets having sixty-five perforations arranged six to the inch or by sheets wherein the perforations are differently arranged. While there are inventions covering various interchangeable devices for varying the scale of tracker-apertures to accomplish this end, my device comprises a construction forming an integral part of the instrument, compact and affording simple adjustment without necessitating removal or addition of any part. I accomplish this by the use of a plurality of trackers having their individual scales of apertures differently arranged, either of which scales may be selectively employed for use with certain sheets having correspondingly arranged perforations.

While I have shown in most of the drawings a two-tracker construction, I am aware that this particular arrangement may not be desirable in all cases, and I have therefore shown clearly in Figs. 6, 7, and 8 that the number of trackers may be increased by simple duplication of the principles of the invention.

A designates the frame of the usual music-roll box containing and in some instruments supporting the music take-up spool B and the removable spool C from which the music-sheet is drawn across a tracker by the take-up spool during operation of the instrument.

1 represents one of the usual series of conductors extending from the tracker devices to any chosen form of note-sounding mechanism. I shall demonstrate in this description the use of rubber tubing as I prefer the same for conductor purposes but it be understood that many other forms of conductors may be employed such as metallic tubing, channeling or boring in wood or metal and electric wiring. I have shown in Figs. 4 and 5 the use of metallic tubing, which may serve to better demonstrate the rigid uniting of the parts into single tracker units.

2 indicates metallic tubes inserted in the conveyer ducts of a part of the device and may represent either nipples for the connection of the rubber tubing or the ends of metallic tube-conductors.

3 is a fixed tracker shown in Figs. 1, 2 and 3 as supported upon brackets D, provided with apertures $a$, conductors 12, switch-member 10, and braces 11.

4 is a tracker arranged for reciprocal motion upon the lower tracker 3 and is provided with apertures $b$, conductors 13, switch-members 9, and braces 8.

As shown in Fig. 1, the apertures $b$ of the movable tracker 4, are arranged in closer relative position or scale than the apertures $a$ of the fixed tracker 3. It may be desirable in some instances to add a third tracker or to arrange the apertures $a$ and $b$ in a different manner as for instance in making provision for selection of solo or melody notes. The tubes 2 may also be displayed in any convenient manner. I have shown in Figs. 2, 3 and 11 my preferred arrangement of the tubes in staggered relation in two rows and in Figs. 4 to 10 (inclusive) a modification wherein they are arranged in a single extended row. This latter method may be preferable in instances wherein lateral space will permit, my preferred method being designed to provide a compact arrangement for limited space.

Referring to Figs. 3, 5, and 11, it will be seen that the forward position of the tracker 4 establishes contact thereof with the sheet 5, and the ducts 19 register with ducts 17 in which are inserted the tubes 2. In this manner the registration of a sheet-perforation with an aperture $b$ may accomplish the actuation of a note-sounding mechanism by means of conductors 13, ducts 18, 19, and 17, and tubes 2. Forward position of the tracker 4 not only establishes its own operative contact with the sheet 5 and communication of its ducts with the conductors of the note-sounding mechanism as described, but at the same time disconnects the tracker 3. The sheet is shown raised from operative contact with the fixed tracker and communication of the ducts of that tracker with the conductors of the note-sounding mechanism is interrupted.

Figs. 2 and 4 illustrate the tracker 4 in rearward position. It will be observed that it has been moved away from operative contact with the sheet and the tracker 3 is now allowed to contact therewith. Registration may now occur between the perforations of the sheet and the apertures $a$ of the tracker 3. During the rearward position of the movable tracker 4 the registration of a sheet-perforation with an aperture $a$ may accomplish actuation of a note-sounding mechanism by means of conductors 12, ducts 14 and 15, connector-channels 16, ducts 17, and tubes 2, and while the connector-channels 16 have been moved to embrace ducts 15 and 17 to accomplish this connection the ducts 19 connected with tracker 4 have been simultaneously moved away from registration with the ducts 17 so that the movable tracker is not only moved away from operative contact with the sheet but its ducts are disconnected from communication with the conductors of the note-sounding mechanism.

It may be preferable to fix the tracker 4 and allow movement of the tracker 3. Such arrangement would not interfere with the operativeness of the device, and would be particularly applicable to the flexible tubing construction shown in Figs. 2 and 3.

In Figs. 6, 7 and 8 I have shown an extension of the system just described to provide by the addition of switch-member 6 for the possible use of three trackers. I prefer in this construction to fix the central tracker to which the central switch-section 10 is attached, although this arrangement is not necessary. Like parts in these three figures have been designated by numerals to agree with the other figures and a short description of the use of the additional member 6 will suffice. In Fig. 6 the switch-member 9 has been moved forward for operative connection of the upper tracker and the ducts 19 register with conveyer-ducts 17 as heretofore described, but the passageway now comprises ducts 18, 19, 17 and 23. In Fig. 7 the switch-members 9 and 6 are both moved back and the central tracker is in operative position, whereby the passageway comprises ducts 14 and 15, connector-channels 16, and ducts 17 and 23. In Fig. 8 the switch-member 6 has been moved forward for operative connection of the lower tracker and the passageway comprises ducts 20 and 21, connector-channels 22 and duct 23.

There are various methods which may be employed for shifting the trackers but I do not desire to limit myself to the employment of any particular device for this purpose and I have therefore shown a most simple method in arranging finger-grips 24 to allow direct reciprocation of the desired member.

I believe that I am the first to provide a plurality of trackers which may be alternately connected and disconnected in the simple manner described or which may be rigidly connected by metallic tubing or other means with the mechanisms to be actuated. I do not wish to be limited therefore to minor details of construction and I am aware that there are changes other than I have mentioned which may be made by those skilled in the art without departure from the principles or operation of my invention.

I therefore claim broadly as follows:—

1. In an instrument of the class described, a tracker-device comprising two elements arranged for relative adjustment, each element having a first and second series of conductors extending therein, the first series of conductors of one element connecting with the first and second series of conductors of the other element, certain relative adjustment of the said elements causing the second series of conductors of said one element to connect with the second series of conductors of said other element.

2. In an instrument of the class described, a tracker-device comprising two elements arranged for relative adjustment, each element having a first and second series of conductors extending therein, certain relative adjustment of said elements causing the first series of conveyers of one element to connect the first and second series of conductors of the other element and another relative adjustment of the said elements causing disconnection of the first and second series of conductors of said other element through the first series of conductors of said one element and connection of the second series of conductors of said one element with the second series of conductors of said other element.

3. In an instrument of the class described, a tracker device comprising a plurality of relatively adjustable trackers, a series of tracker conductors arranged in each of said trackers, a separate series of conductors, and means through which relative adjustment of said trackers effects connection of a selected series of tracker conductors with said separate series of conductors and disconnection or separation of the other series of tracker conductors therefrom.

4. In combination with a controlling-sheet, sheet-controllable mechanisms and conductors (2) extending from said mechanisms to conduct impulses to said mechanisms, a tracker-device comprising a plurality of trackers arranged for relative adjustment, conductors extending in each of said trackers for connection with the first-named conductors for transmitting impulses thereto from said sheet, and means through which the connection of the conductors of each tracker with the first-named conductors is dependent upon the relative adjustment of a plurality of said trackers.

5. In an instrument of the class described, in combination with a controlling-sheet, sheet-controllable mechanism and conductors (2) extending from said mechanisms to conduct impulses to said mechanisms, a plurality of trackers arranged for relative adjustment, conductors extending in each of said trackers for connection with the first-named conductors for transmitting impulses thereto from said sheet, and means through which relative adjustment of the trackers to present one thereof for contact with said sheet causes connection of the conductors extending in that tracker with the first-named conductors and disconnection from the first-named conductors of the conductors extending in the other trackers.

6. In an instrument of the class described, the combination with a series of conductors, ing a plurality of members arranged for relative adjustment, a controlling-sheet, a plurality of trackers arranged for relative adjustment into positions for contact with said controlling-sheet, conductors extending between each tracker and switch-member and secondary conductors extending from the switch-device, the relative position of said switch-members causing connection between the said secondary conductors and the conductors extending to the tracker which is in position for contact with said sheet.

7. In an instrument of the class described, the combination with a series of conductors, of a fixed tracker and conductors arranged therein, a movable tracker and conductors arranged therein and means for effecting the connection and disconnection of the said conductors arranged in the fixed tracker with the said series of conductors through alternate movement of said movable tracker in reverse directions.

8. In an instrument of the class described, the combination with a series of conductors, of a fixed tracker and conductors arranged therein, a movable tracker and conductors arranged therein and means for effecting the connection of the said conductors arranged in the fixed tracker with the said series of conductors through movement of said movable tracker into a predetermined position and for effecting the connection of the said conductors arranged in the movable tracker with the said series of conductors through movement of said movable tracker into another predetermined position.

Signed at Chicago, Illinois, this nineteenth day of December, 1907, in the presence of two subscribing witnesses.

JAMES CLARKE HAGEY.

Witnesses:
H. W. JARROW,
W. E. GUYLEE.

Corrections in Letters Patent No. 1,031,923.

It is hereby certified that in Letters Patent No. 1,031,923, granted July 9, 1912, upon the application of James Clarke Hagey, of Chicago, Illinois, for an improvement in "Tracker Devices for Sheet-Controlled Instruments," errors appear in the printed specification requiring correction as follows: Page 2, line 11, strike out the word "conveyer;" same page, line 22, for the compound word "switch-members" read *switch-member;* and same page, line 106, for the compound word "conveyer-ducts" read *ducts;* page 3, line 28, for the word "conveyers" read *conductors;* same page, line 66, for the word "mechanism" read *mechanisms;* and same page, line 82, strike out the words "with a series of conductors" and insert the words and syllables *of a switch-device compris-;* and that the said Letters Patent should be read with these corrections therein that the same may conform to the record of the case in the Patent Office.

Signed and sealed this 3rd day of September, A. D., 1912.

[SEAL.]

E. B. MOORE,

*Commissioner of Patents.*